(12) United States Patent
Hirose et al.

(10) Patent No.: US 6,464,904 B1
(45) Date of Patent: Oct. 15, 2002

(54) TRIPHENYLENE DERIVATIVE, ION-TRANSPORTING COMPOUND ELECTROLYTE AND ION-TRANSPORTING METHOD

(75) Inventors: Takuji Hirose, Urawa; Shinichi Nakamura, Isehara; Satoshi Igawa, Fujisawa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,533

(22) Filed: May 26, 2000

(30) Foreign Application Priority Data

May 26, 1999 (JP) ............................... 11-147139
May 26, 1999 (JP) ............................... 11-147140
May 26, 1999 (JP) ............................... 11-147141

(51) Int. Cl.$^7$ ........................... H01B 1/06; H01B 1/12; H01M 10/40
(52) U.S. Cl. ................. 252/622; 252/500; 428/1.4; 429/188; 429/199; 359/265
(58) Field of Search ............... 252/299.3, 62.2, 252/500; 428/1.4; 429/188, 199; 345/49; 359/265

(56) References Cited

FOREIGN PATENT DOCUMENTS

| EP | 386576 | * 2/1990 |
| JP | 9-330739 | * 12/1997 |
| JP | 10-120730 | 5/1998 |

OTHER PUBLICATIONS

*Polymer Reprints*, Japan, vol. 40(10), 3766, 3768 (1991).
M. Watanabe et al., "Estimation of Li$^+$ Transport Number in Polymer Electrolytes by the Combination of Complex Impedance and Potentiostatic Polarization Measurements," 28–30 *Solid State Ionics* 911–917 (1988).

S. Takenaka, "Design and Synthsis of Discotic Liquid Crystal Molecules," *Japanese Chemical Society, Seasonal Publication, General Review*, vol. 22, pp. 60–72, 1994.

(List continued on next page.)

*Primary Examiner*—Shean C. Wu
(74) *Attorney, Agent, or Firm*—Fitzpatrick, Cella, Harper & Scinto

(57) ABSTRACT

A triphenylene derivative represented by the following formula (I):

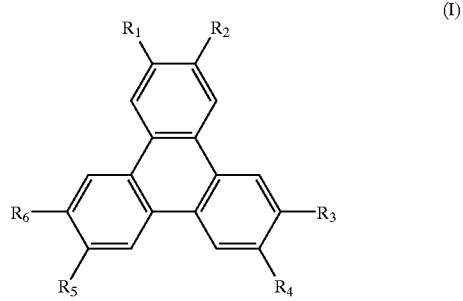

wherein $R_1$–$R_6$ independently denote an ethoxy or propoxy group-containing segment having at least two ether oxygen atoms and a terminal group comprising a linear or branched alkyl group having 1–20 carbon atoms, said alkyl group including at least one hydrogen atom optionally substituted with fluorine atom and at least one methylene group optionally substituted with —O—, —CO—, —CH=CH—, —C≡C— or epoxy group. The triphenylene derivative is usable as an ion-transporting compound of a component for an electrolyte of, e.g., secondary battery since the triphenylene derivative has an ionic conductivity anisotropy due to its columnar structure in discotic liquid crystal phase.

12 Claims, 6 Drawing Sheets

OTHER PUBLICATIONS

N. Boden et al., "Designing New Lyotropic Amphiphilic Mesogens to Optimize the Stability of Nematic Phases," *Liquid Crystals*, vol. 1(2), pp. 109–125 (1986).

P.V. Wright et al., "Complexes of Alkali Metal Ions With Poly(ethylene Oxide)" (1973).

K. Ito, "Effect of Terminal Groups on the Ionic Conductivity of α,ω–Discharged Poly(Ethylene Oxide) Oligomers," *Solid State Ionics*, vol. 86–88, pp. 325–328 (1996).

K. Ito, "Polyether/Salt Hybrid (IV). Effect of Benzenesulfonate Group(s) and PEO Molecular Weight on the Bulk Ionic Conductivity," *Electrochemica Acta*, vol. 42(10), pp. 1561–1570 (1997).

N.H. Tinh, et al., "Dissymmetric Hexasubstituted Triphenylenes", Mol. Cryst. Liq. Cryst., vol. 65, pp. 307–316 (1981).

S. Chandrasekhar, et al., "Discotic liquid crystals", Rep. Prog. Phys., vol. 53, pp. 57–84 (1990).

S. Chandrasekhar, et al., "Liquid crystals of disc–like molecules", Pramana, vol. 9, No. 5, pp. 471–480 (1977).

J. Lehn, et al., "Tubular Mesophases: Liquid Crystals consisting of Macrocyclic Molecules", J. Chem. Soc., Chem. Commun., No. 24, pp. 1794–1796 (1985).

C. Piechocki, et al., "Discotic Mesophases Obtained from Substituted Metallophthalocyanines", J. Am. Chem. Soc., vol. 104, pp. 5245–5247 (1982).

CAPLUS 1998: 10729*

CPLUS 1991: 92406*

* cited by examiner

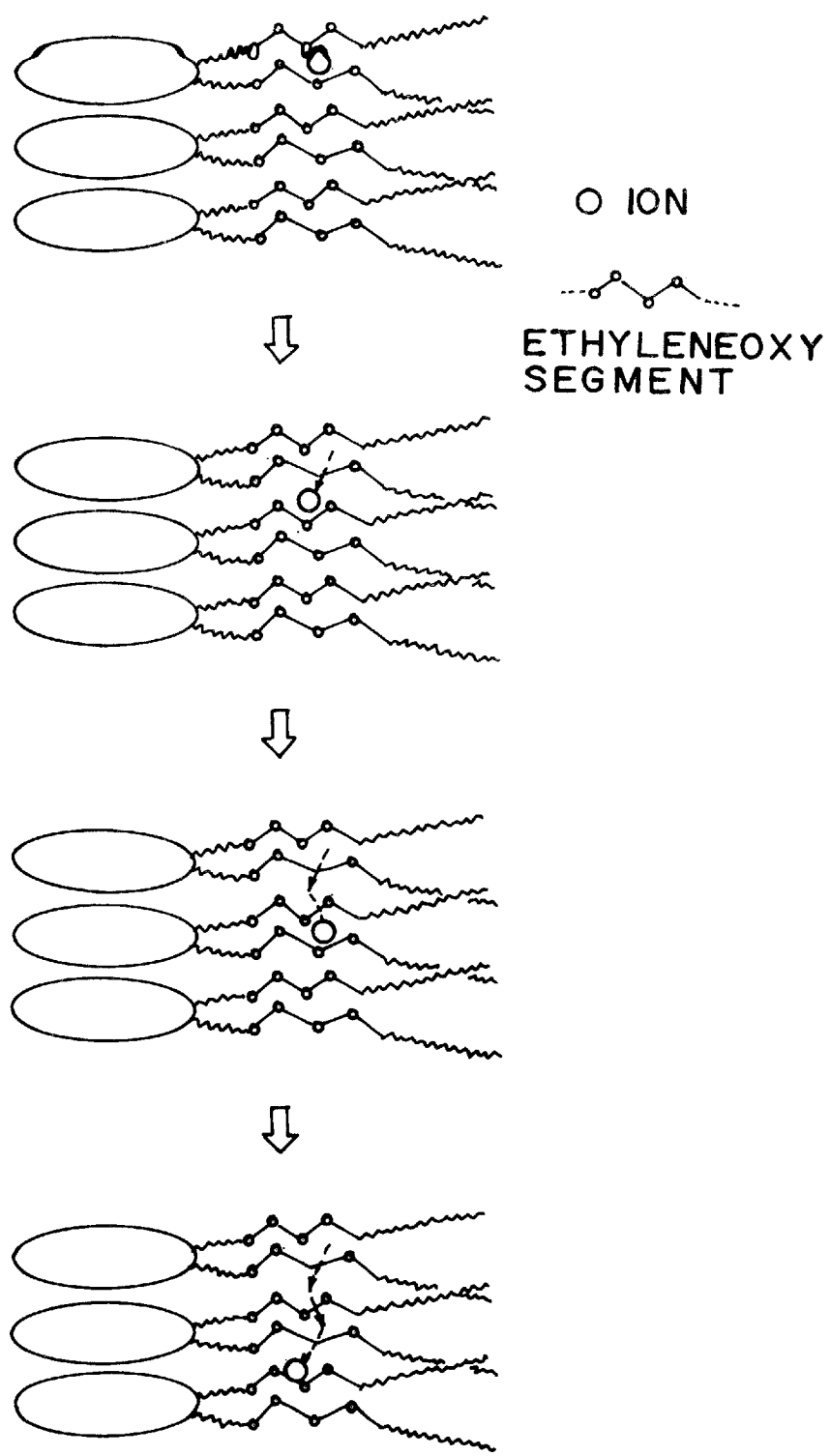
F I G. 4

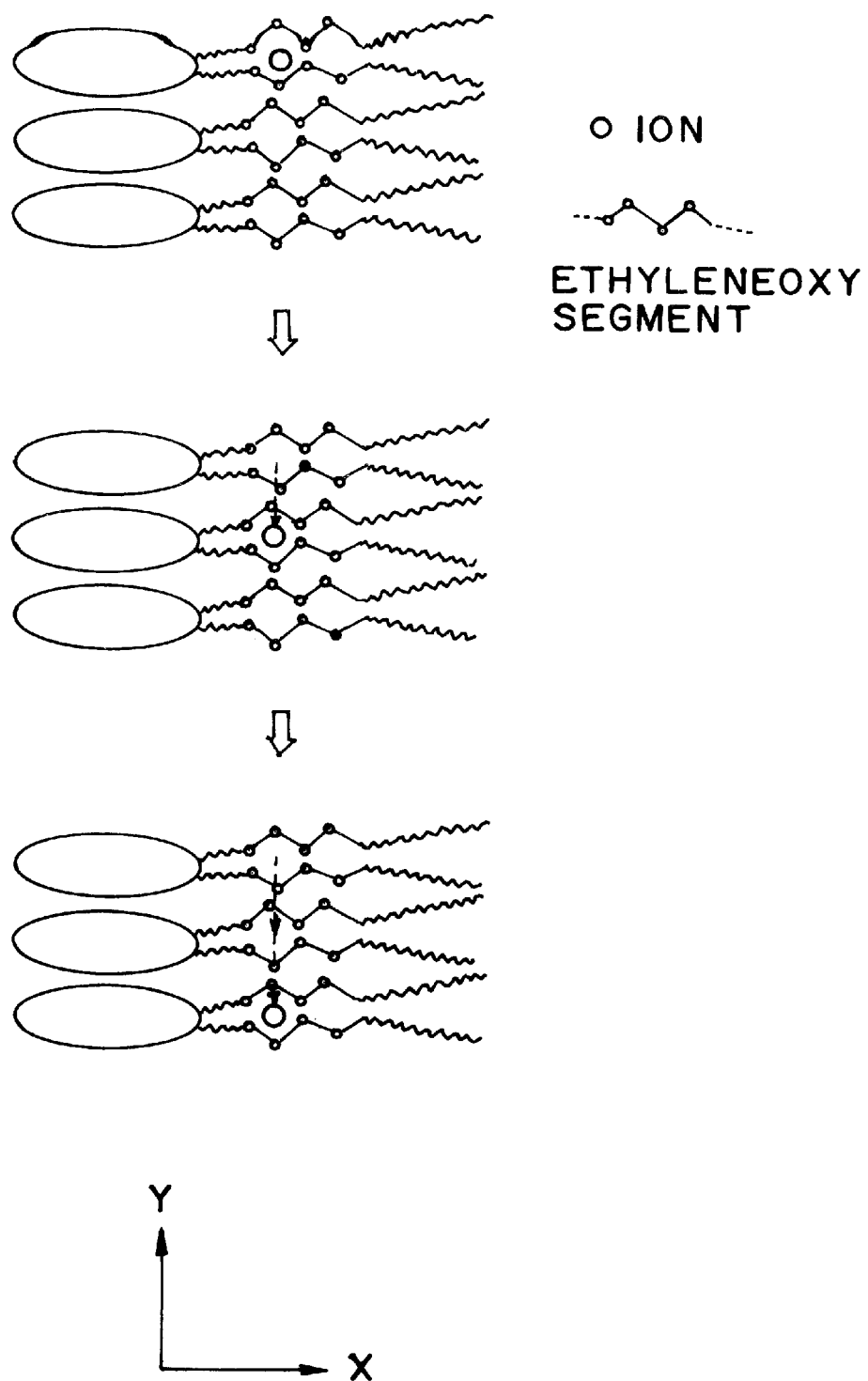
F I G. 5

TRIPHENYLENE DERIVATIVE, ION-TRANSPORTING COMPOUND ELECTROLYTE AND ION-TRANSPORTING METHOD

FIELD OF THE INVENTION AND RELATED ART

The present invention relates to a triphenylene derivative useful for a discotic liquid crystal material, an ion-transporting layer structure utilizing a discotxic liquid crystal phase, and an ion-transporting method using the layer structure. The present invention also relates to an electrolyte for use in battery, sensor device, etc., in the field of electronics.

Discotic liquid crystal (phase) is a liquid crystal (phase) discovered in 1977 by Chandrasekhar, et al. (Pramana, 9, 471 (1977)). As described in their paper entitled "Discotic Liquid Crystals" (Rep. Prog. Phys., 53, 57 (1990)) and in a paper entitled "Design and Synthesis of Discotic Liquid Crystal Molecules (in Japanese)" by Shunsuke Takenaka (Japanese Chemical Society, Seasonal Publication, General Review, vol. 22, pp. 60-), the discotic liquid crystal phase is found in compounds having a disk-shaped core and a plurality of relatively long chains connected to the core. Such compounds may be classified into various types according to their core structure, inclusive of derivatives of hexa-substituted benzene and tri-substituted benzene; derivatives of phthalocyanine and porphyrin; derivatives of triphenylene, truxene and pyrylium, respectively; tribenzocyclononene derivatives, azacrown derivatives, and cyclohexane derivatives.

Based on the structure characteristic of a discotic liquid crystal, several reports have been made suggesting application thereof to devices. A system including conjugated π-electrons as found in derivatives of phthalocyanine or triphenylene can provide a channel for electrons (or holes) (Piechocki, et al; J. Am. Chem. Soc. 1982, 104, pp. 5245). Further, a system including an annular core as found in an aza-crown derivative, can provide a molecular channel using the central spacing thereof as a selective molecular passage (Lehn, et al.; J. Chem. Soc., Chem. Commun., 1985, pp. 1974).

Compounds having a triphenylene skeleton have been proposed in "Mol. Cryst. Liq. Cryst.", 65,307 (1981); "Liquid Crystal", 1986, vol. 1, No. 2. pp. 109–125; Japanese Laid-Open Patent Application (JP-A) 10-120730, etc. However, such compounds per se do not have mesomorphic properties and/or a molecular structure having at least two ether oxygen atoms in their side chains as in the triphenylene derivative according to the present invention specifically described hereinafter.

An ion-transporting mechanism may generally be classified into two types. Specifically, in the case where an electrolyte comprises an electrolytic aqueous solution or an organic electrolytic solution, the ion-transporting mechanism is based on migration of ions dissociated by salvation with a solvent. On the other hand, in the case of an organic solid electrolyte, the ion-transporting mechanism is based on a successive ligand exchange such that ions dissociated by coordination with a polar group (as a donor) are transported by segment movement as in the case of, e.g., polyethylene oxide (PEO). In the former case, an ion-transporting efficiency is higher but its practical application is limited due to the liquid-state transport. In the latter case, the transport mechanism is based on a thermal segment movement of a polymer chain, thus being liable to be affected by a fluctuation in temperature. Further, the polymer chain has a disorderedly entangled structure, thus failing to perform an efficient ion transport.

With respect to polyethylene oxide (PEO), Wright et al. have reported in 1973 an ion conductive characteristic of a complex of PEO with a metal salt and Armand et al. have suggested in 1979 the possibility of use of an electrolyte for a battery. As a result, extensive research and development as to an organic solid electrolyte have been widely made in the world. The solid electrolyte is not in the liquid state, thus being free from leakage thereof to the outside. Further, the solid electrolyte has the advantages of heat-resistance, reliability, safety properties, and size-reduction in a resultant device, when compared with the liquid electrolyte. Further, the organic electrolyte is softer than the inorganic electrolyte, thus being readily shaped or processed advantageously.

Generally, an ionic conductivity of the electrolyte may be represented by a product of carrier density, (electric) charge, and ionic mobility. Accordingly, the electrolyte is required to have a higher polarity for dissociating ions and a lower viscosity for moving the dissociated ions. In view of these properties, the above-mentioned PEO is insufficient to provide the resultant solid electrolyte with such properties. As described above, the ion-transporting mechanism of PEO is based on the successive ligand exchange of dissociated ions by thermal segment movement of its polymer chain, thus being liable to be largely affected by a change in temperature. In order to increase carrier density, when a large amount of metal ion is incorporated in the PEO-based solid electrolyte, crystallization is liable to occur in the system, thus adversely lower the ionic mobility. In order to prevent such a crystallization, derivatives or modified products of PEO insulating one crosslinked with an urethane component (M. Watanabe et al. "Solid State Ionics", 28–30; 911, 1988), one having a side chain introduced into a crosslinked potion for improving the ionic mobility at low temperature "Preprints for the 40-th Polymer Discussion (in Japanese)", 2766, 1991) and one of fused-salt type having a terminal portion into which a salt is incorporated (K. Ito et al., "Solid State Ionics", 86–88, 325, 1996 and K. Ito et al., "Electrochim. Actal", 42, 1561, 1977) have been developed.

Such modified PEOs, however, have failed to provide a sufficient ionic conductivity as yet. For this reason, an electrolytic solution comprising a mixture of a high-permittivity organic solvent and a low-viscosity solvent or a gel-type electrolyte wherein an electrolytic solution is solidified by an organic polymeric compound is predominantly used.

Further, in the case of utilizing the solid electrolyte for a battery device, it is important to improve not only the ion-transporting efficiency but also an efficiency of electrochemical reaction.

SUMMARY OF THE INVENTION

In view of the above-mentioned problems, an object of the present invention is to provide a triphenylene derivative useful for a discotic liquid crystal material.

Another object of the present invention is to provide an ion-transporting layer structure excellent in ion-transporting efficiency utilizing a discotic liquid crystal phase, and an ion-transporting method using the ion-transporting layer structure.

A further, object of the present invention is to provide an electrolyte, capable of providing a high ion-transporting efficiency and a decreased temperature-dependence of an ionic conductivity, useful for a battery, a sensor device, etc., in the field of electronics.

According to the present invention, there is provided a triphenylene derivative represented by the following formula (I):

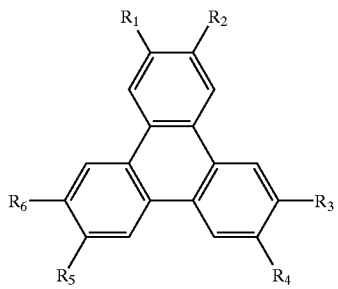

wherein $R_1$–$R_6$ independently denote an ethoxy or propoxy group-containing segment having at least two ether oxygen atoms and a terminal group comprising a linear or branched alkyl group having 1–20 carbon atoms, the alkyl group including at least one hydrogen atom optionally substituted with fluorine atom and at least one methylene group optionally substituted with —O—, —CO—, —CH=CH—, —C≡C— or epoxy group.

According to the present invention, there is also provided an ion-transporting layer structure, comprising:
a plurality of ion-transporting molecules having a polar molecular chain and arranged in a layer wherein a plurality of the polar molecular chains are two-dimensionally extended in a layer direction and associated with each other to form a channel through which an ion is transported in a direction perpendicular to the layer direction.

According to the present invention, there is further provided an electrolyte, comprising: at least one species of a compound comprising a discotic mesogen group and a polar side chain connected to the discotic mesogen group, and at least one species of a metal salt, the electrolyte having a ionic conductivity anisotropy.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4 and 5 are schematic views each for illustrating an ion-transporting mechanism for the ion-transporting method according to the present invention.

DETAILED DESCRIPTION OF THE PREFERRED EMBODIMENTS

Figure 1:
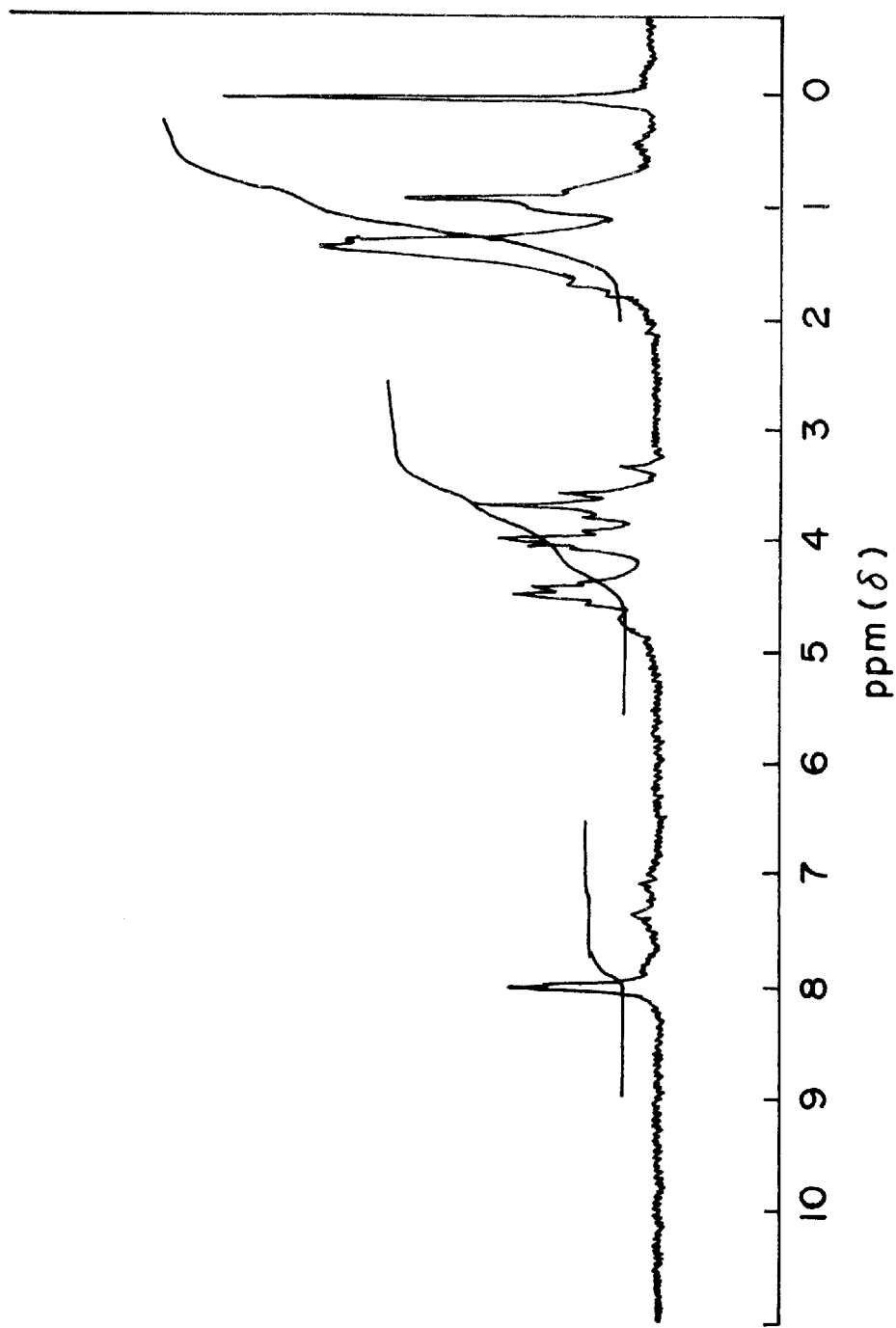
FIG. 1 is an NMR chart for 2,3,6,7,10,11-hexa(2-hexyloxyethoxy)triphenylene prepared in Production Example 1 appearing hereinafter.

The triphenylene derivative according to the present invention is characterized by having a specific molecular structure represented by the above-mentioned formula:(I).

In the above-mentioned formula (I), the ethoxy or propoxy group-containing segment for $R_1$ to $R_6$ was preferably be represented by —O(CH$_2$CH$_2$O)$_n$R$_7$ or —O(CH$_2$CH$_2$CH$_2$O)$_n$R$_7$ where n is an integer of 1–20 and R$_7$ is a linear or branched alkyl group having 4–20 carbon atoms, and the alkyl group may include at least one hydrogen atom optionally substituted with fluorine atom and at least one methylene group optionally substituted with —O—, —CO—, —CH=CH—, —C≡C— or epoxy group.

In view of mesomorphic properties, n may preferably be an integer of 1–3, particularly 2 or 3, and $R_7$ may preferably be a linear or branched alkyl group having 4–20, more preferably 4–10 carbon atoms, such as pentyl, heptyl, nonyl, undecyl, tridecyl or hexadecyl.

The triphenylene derivative may preferably assume a discotic liquid crystal phase, particularly a discotic columnar phase.

In the case of using the triphenylene derivative in a polymerized form, the triphenylene derivative may preferably have a (polymerizable) terminal group, such as —CH=CH$_2$, —CH≡CH or epoxy group.

The above-mentioned triphenylene derivative of the formula (I) may, e.g., be synthesized through the following reaction schemes (1) and (2).

(1) Case where $R_1$=$R_2$=$R_3$=$R_4$=$R_5$=$R_6$=Ra 2,3,6,7,10,11-hexahydroxytriphenylene is reacted with an appropriate halogen or tosylate derivative of Ra (Ra—X; X=I, Br, p-toluenesulfonyl (6 equivalent mole) in the presence of a base according to the following reaction formula.

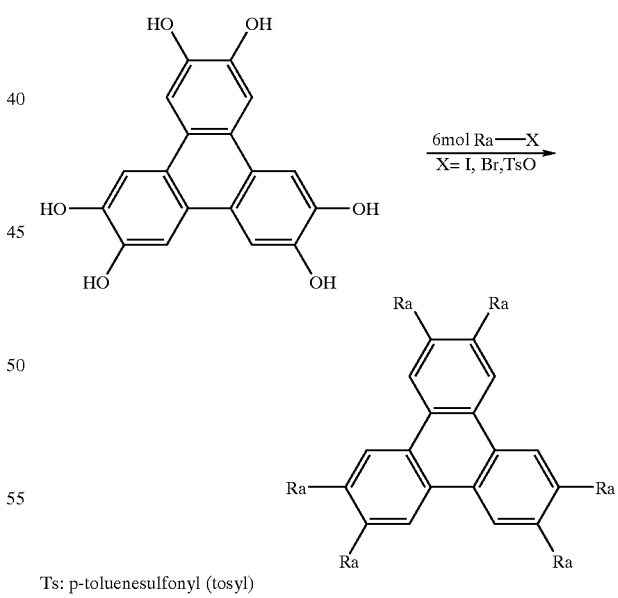

Ts: p-toluenesulfonyl (tosyl)

(2) Case where $R_1$=$R_3$=$R_5$=Ra and $R_2$=$R_4$=$R_6$=Rb 2,3,6,7,10,11-hexahydroxytriphenylene is first reacted with an appropriate halogen or tosylate derivative of Ra (3 equivalent mole) and then is reacted with an appropriate halogen or tosylate derivative of Rb (3 equivalent mole), respectively, in the presence of a base, according to the following reaction formula.

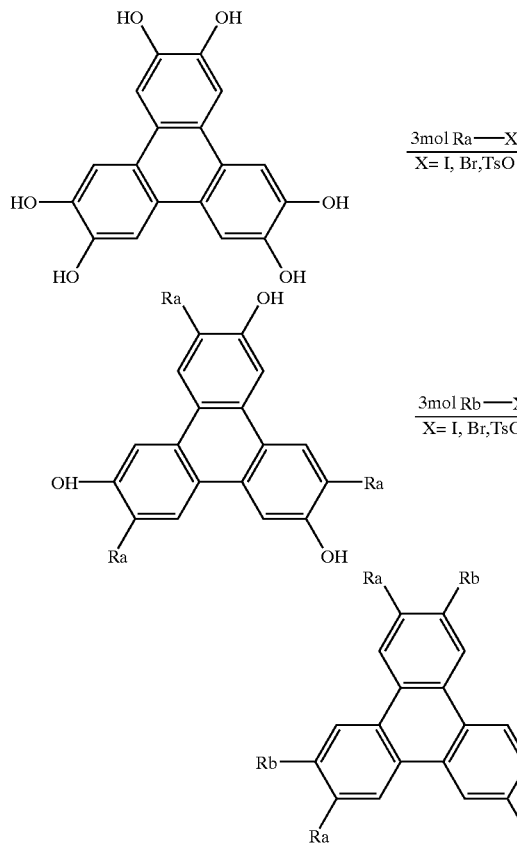

Specific examples of the above-prepared triphenylene derivative of the formula (I) may include those shown in Tables 1–9 (Example Compounds Nos. T1 to T-90) below, but the triphenylene derivative of the present invention is not restricted to these compounds.

TABLE 1

| No. | $R_1, R_2, R_3, R_4, R_5, R_6$ |
|---|---|
| T-1 | $R_1=R_2=R_3=R_4=R_5=R_6=OCH_2CH_2OCH_3$ |
| T-2 | $R_1=R_2=R_3=R_4=R_5=R_6=OCH_2CH_2OC_2H_5$ |
| T-3 | $R_1=R_2=R_3=R_4=R_5=R_6=OCH_2CH_2OC_3H_7$ |
| T-4 | $R_1=R_2=R_3=R_4=R_5=R_6=OCH_2CH_2OC_4H_9$ |
| T-5 | $R_1=R_2=R_3=R_4=R_5=R_6=OCH_2CH_2OC_5H_{11}$ |
| T-6 | $R_1=R_2=R_3=R_4=R_5=R_6=OCH_2CH_2OC_6H_{13}$ |
| T-7 | $R_1=R_2=R_3=R_4=R_5=R_6=OCH_2CH_2OC_7H_{15}$ |
| T-8 | $R_1=R_2=R_3=R_4=R_5=R_6=OCH_2CH_2OC_8H_{17}$ |
| T-9 | $R_1=R_2=R_3=R_4=R_5=R_6=OCH_2CH_2OC_9H_{19}$ |
| T-10 | $R_1=R_2=R_3=R_4=R_5=R_6=OCH_2CH_2OC_{10}H_{21}$ |
| T-11 | $R_1=R_2=R_3=R_4=R_5=R_6=O(CH_2CH_2O)_2CH_3$ |
| T-12 | $R_1=R_2=R_3=R_4=R_5=R_6=O(CH_2CH_2O)_2C_2H_5$ |

TABLE 2

| No. | $R_1, R_2, R_3, R_4, R_5, R_6$ |
|---|---|
| T-13 | $R_1=R_2=R_3=R_4=R_5=R_6=O(CH_2CH_2O)_2C_3H_7$ |
| T-14 | $R_1=R_2=R_3=R_4=R_5=R_6=O(CH_2CH_2O)_2C_4H_9$ |
| T-15 | $R_1=R_2=R_3=R_4=R_5=R_6=O(CH_2CH_2O)_2C_5H_{11}$ |
| T-16 | $R_1=R_2=R_3=R_4=R_5=R_6=O(CH_2CH_2O)_2C_6H_{13}$ |
| T-17 | $R_1=R_2=R_3=R_4=R_5=R_6=O(CH_2CH_2O)_2C_7H_{15}$ |
| T-18 | $R_1=R_2=R_3=R_4=R_5=R_6=O(CH_2CH_2O)_2C_8H_{17}$ |
| T-19 | $R_1=R_2=R_3=R_4=R_5=R_6=O(CH_2CH_2O)_2C_9H_{19}$ |
| T-20 | $R_1=R_2=R_3=R_4=R_5=R_6=O(CH_2CH_2O)_2C_{10}H_{21}$ |
| T-21 | $R_1=R_2=R_3=R_4=R_5=R_6=O(CH_2CH_2O)_3CH_3$ |
| T-22 | $R_1=R_2=R_3=R_4=R_5=R_6=O(CH_2CH_2O)_3C_2H_5$ |
| T-23 | $R_1=R_2=R_3=R_4=R_5=R_6=O(CH_2CH_2O)_3C_3H_7$ |
| T-24 | $R_1=R_2=R_3=R_4=R_5=R_6=O(CH_2CH_2O)_3C_4H_9$ |

TABLE 3

| No. | $R_1, R_2, R_3, R_4, R_5, R_6$ |
|---|---|
| T-25 | $R_1=R_2=R_3=R_4=R_5=R_6=O(CH_2CH_2O)_3C_5H_{11}$ |
| T-26 | $R_1=R_2=R_3=R_4=R_5=R_6=O(CH_2CH_2O)_3C_6H_{13}$ |
| T-27 | $R_1=R_2=R_3=R_4=R_5=R_6=O(CH_2CH_2O)_3C_7H_{15}$ |
| T-28 | $R_1=R_2=R_3=R_4=R_5=R_6=O(CH_2CH_2O)_3C_8H_{17}$ |
| T-29 | $R_1=R_2=R_3=R_4=R_5=R_6=O(CH_2CH_2O)_3C_9H_{19}$ |
| T-30 | $R_1=R_2=R_3=R_4=R_5=R_6=O(CH_2CH_2O)_3C_{10}H_{21}$ |
| T-31 | $R_1=R_2=R_3=R_4=R_5=R_6=O(CH_2CH_2O)_4CH_3$ |
| T-32 | $R_1=R_2=R_3=R_4=R_5=R_6=O(CH_2CH_2O)_4C_2H_5$ |
| T-33 | $R_1=R_2=R_3=R_4=R_5=R_6=O(CH_2CH_2O)_4C_4H_9$ |
| T-34 | $R_1=R_2=R_3=R_4=R_5=R_6=O(CH_2CH_2O)_5CH_3$ |
| T-35 | $R_1=R_2=R_3=R_4=R_5=R_6=O(CH_2CH_2O)_5C_5H_{11}$ |
| T-36 | $R_1=R_2=R_3=R_4=R_5=R_6=O(CH_2CH_2O)_5C_8H_{17}$ |

TABLE 4

| No. | R₁, R₂, R₃, R₄, R₅, R₆ |
|---|---|
| T-37 | $R_1=R_2=R_3=R_4=R_5=R_6=O(CH_2CH_2O)_6CH_3$ |
| T-38 | $R_1=R_2=R_3=R_4=R_5=R_6=O(CH_2CH_2O)_6C_{10}H_{21}$ |
| T-39 | $R_1=R_2=R_3=R_4=R_5=R_6=O(CH_2CH_2O)_6C_{15}H_{31}$ |
| T-40 | $R_1=R_2=R_3=R_4=R_5=R_6=O(CH_2CH_2O)_7CH_3$ |
| T-41 | $R_1=R_2=R_3=R_4=R_5=R_6=O(CH_2CH_2O)_7C_{10}H_{21}$ |
| T-42 | $R_1=R_2=R_3=R_4=R_5=R_6=O(CH_2CH_2O)_8CH_3$ |
| T-43 | $R_1=R_2=R_3=R_4=R_5=R_6=O(CH_2CH_2O)_8C_8H_{17}$ |
| T-44 | $R_1=R_2=R_3=R_4=R_5=R_6=O(CH_2CH_2O)_{10}CH_3$ |
| T-45 | $R_1=R_2=R_3=R_4=R_5=R_6=O(CH_2CH_2O)_{14}CH_3$ |
| T-46 | $R_1=R_2=R_3=R_4=R_5=R_6=O(CH_2CH_2O)_{16}CH_3$ |
| T-47 | $R_1=R_2=R_3=R_4=R_5=R_6=O(CH_2CH_2O)_{20}CH_3$ |
| T-48 | $R_1=R_2=R_3=R_4=R_5=R_6=O(CH_2CH_2O)_2OCCH=CH_2$ |

TABLE 5

| No. | R₁, R₂, R₃, R₄, R₅, R₆ |
|---|---|
| T-49 | $R_1=R_2=R_3=R_4=R_5=R_6=O(CH_2CH_2O)_3OCCH=CH_2$ |
| T-50 | $R_1=R_2=R_3=R_4=R_5=R_6=O(CH_2CH_2O)_4OCCH=CH_2$ |
| T-51 | $R_1=R_2=R_3=R_4=R_5=R_6=O(CH_2CH_2O)_5OCCH=CH_2$ |
| T-52 | $R_1=R_2=R_3=R_5=O(CH_2CH_2O)_2C_4H_9$, $R_4=R_6=O(CH_2CH_2O)_2OCCH=CH_2$ |
| T-53 | $R_1=R_2=R_3=R_5=O(CH_2CH_2O)_3C_4H_9$, $R_4=R_6=O(CH_2CH_2O)_3OCCH=CH_2$ |
| T-54 | $R_1=R_2=R_3=R_5=O(CH_2CH_2O)_5C_4H_9$, $R_4=R_6=O(CH_2CH_2O)_5OCCH=CH_2$ |
| T-55 | $R_1=R_2=R_3=R_5=O(CH_2CH_2O)_6C_4H_9$, $R_4=R_6=O(CH_2CH_2O)_6OCCH=CH_2$ |

TABLE 6

| No. | R₁, R₂, R₃, R₄, R₅, R₆ |
|---|---|
| T-56 | $R_1=R_3=R_5=O(CH_2CH_2O)_2C_6H_9$, $R_2=R_4=R_6=O(CH_2CH_2O)_2OCCH=CH_2$ |
| T-57 | $R_1=R_3=R_5=O(CH_2CH_2O)_5C_8H_9$, $R_2=R_4=R_6=O(CH_2CH_2O)_5OCCH=CH_2$ |
| T-58 | $R_1=R_3=R_5=O(CH_2CH_2O)_{10}C_{10}H_9$, $R_2=R_4=R_6=O(CH_2CH_2O)_{10}OCCH=CH_2$ |
| T-59 | $R_1=R_3=R_5=O(CH_2CH_2O)_2C_4H_9$, $R_2=R_4=R_6=O(CH_2CH_2O)_2OCH_2CH=CH_2$ |
| T-60 | $R_1=R_3=O(CH_2CH_2O)_3C_6H_{13}$, $R_2=R_4=R_5=R_6=O(CH_2CH_2O)_3OCCH=CH_2$ |
| T-61 | $R_1=R_2=R_3=R_4=R_5=R_6=OCH_2CH_2CH_2OCH_3$ |
| T-62 | $R_1=R_2=R_3=R_4=R_5=R_6=OCH_2CH_2CH_2OC_2H_5$ |

TABLE 7

| No. | R₁, R₂, R₃, R₄, R₅, R₆ |
|---|---|
| T-63 | $R_1=R_2=R_3=R_4=R_5=R_6=OCH_2CH_2CH_2OC_3H_7$ |
| T-64 | $R_1=R_2=R_3=R_4=R_5=R_6=OCH_2CH_2CH_2OC_4H_9$ |
| T-65 | $R_1=R_2=R_3=R_4=R_5=R_6=OCH_2CH_2CH_2OC_5H_{11}$ |
| T-66 | $R_1=R_2=R_3=R_4=R_5=R_6=OCH_2CH_2CH_2OC_6H_{13}$ |
| T-67 | $R_1=R_2=R_3=R_4=R_5=R_6=OCH_2CH_2CH_2OC_7H_{15}$ |
| T-68 | $R_1=R_2=R_3=R_4=R_5=R_6=OCH_2CH_2CH_2OC_8H_{17}$ |
| T-69 | $R_1=R_2=R_3=R_4=R_5=R_6=OCH_2CH_2CH_2OC_9H_{19}$ |
| T-70 | $R_1=R_2=R_3=R_4=R_5=R_6=OCH_2CH_2CH_2OC_{10}H_{21}$ |
| T-71 | $R_1=R_2=R_3=R_4=R_5=R_6=O(CH_2CH_2CH_2O)_2CH_3$ |
| T-72 | $R_1=R_2=R_3=R_4=R_5=R_6=O(CH_2CH_2CH_2O)_2C_2H_3$ |
| T-73 | $R_1=R_2=R_3=R_4=R_5=R_6=O(CH_2CH_2CH_2O)_2C_3H_7$ |
| T-74 | $R_1=R_2=R_3=R_4=R_5=R_6=O(CH_2CH_2CH_2O)_3C_4H_9$ |

TABLE 8

[Triphenylene structure with substituents R1, R2, R3, R4, R5, R6]

| No. | R1 | R2 | R3 | R4 | R5 | R6 |
|---|---|---|---|---|---|---|
| T-75 | $R_1=R_2=R_3=R_4=R_5=R_6=O(CH_2CH_2CH_2O)_3C_6H_{11}$ | | | | | |
| T-76 | $R_1=R_2=R_3=R_4=R_5=R_6=O(CH_2CH_2CH_2O)_4C_6H_{13}$ | | | | | |
| T-77 | $R_1=R_2=R_3=R_4=R_5=R_6=O(CH_2CH_2CH_2O)_4C_7H_{15}$ | | | | | |
| T-78 | $R_1=R_2=R_3=R_4=R_5=R_6=O(CH_2CH_2CH_2O)_5C_8H_{17}$ | | | | | |
| T-79 | $R_1=R_2=R_3=R_4=R_5=R_6=O(CH_2CH_2CH_2O)_5C_9H_{19}$ | | | | | |
| T-80 | $R_1=R_2=R_3=R_4=R_5=R_6=O(CH_2CH_2CH_2O)_6C_{10}H_{21}$ | | | | | |
| T-81 | $R_1=R_2=R_3=R_4=R_5=R_6=OCH_2CH_2CH_2OCH_2CH_2OCH_3$ | | | | | |
| T-82 | $R_1=R_2=R_3=R_4=R_5=R_6=O(CH_2CH_2CH_2O)_2(CH_2CH_2O)_3CH_3$ | | | | | |
| T-83 | $R_1=R_2=R_3=R_4=R_5=R_6=OCH_2CH_2OCH_2C_3F_7$ | | | | | |
| T-84 | $R_1=R_2=R_3=R_4=R_5=R_6=OCH_2CH_2O(CH_2)_6C_3F_7$ | | | | | |
| T-85 | $R_1=R_2=R_3=R_4=R_5=R_6=O(CH_2CH_2O)_3(CH_2)_3C_4F_9$ | | | | | |
| T-86 | $R_1=R_2=R_3=R_4=R_5=R_6=O(CH_2CH_2CH_2O)_2(CH_2)_3C_6F_{13}$ | | | | | |

TABLE 9

[Triphenylene structure with substituents R1, R2, R3, R4, R5, R6]

| No. | R1 | R2 | R3 | R4 | R5 | R6 |
|---|---|---|---|---|---|---|
| T-87 | $R_1=R_2=R_3=R_5=O(CH_2CH_2O)_2(CH_2)_3C_4F_9$, $R_4=R_6=O(CH_2CH_2O)_2OCCH=CH_2$ | | | | | |
| T-88 | $R_1=R_2=R_3=R_5=O(CH_2CH_2CH_2O)_3C_4H_9$, $R_4=R_6=O(CH_2CH_2CH_2O)_3OCCH=CH_2$ | | | | | |
| T-89 | $R_1=R_3=O(CH_2CH_2CH_2O)_3C_6H_{13}$, $R_2=R_4=R_5=R_6=O(CH_2CH_2CH_2O)_3OCCH=CH_2$ | | | | | |
| T-90 | $R_1=R_3=O(CH_2CH_2CH_2O)_3C_6H_{13}$, $R_2=R_4=R_5=R_6=O(CH_2CH_2CH_2O)_3OCCH=CH_2$ | | | | | |

Triphenylene compounds (derivatives) having a triphenylene skeleton have been known as described above ((a) Mol. Cryst. Liq. Cryst., 65,307 (1981); (b) Liquid Crystal, 1986, vol. 1, No. 2, pp. 109–125 and (c) JP-A 10-12730).

However, those in the reference (a) do not contain an ether oxygen atom. Those in the reference (b) contain an ether oxygen atoms but do not show mesomorphism alone and constitute a lyotropic liquid crystal in mixture with water. Further, those in the reference (c) have a molecular structure wherein a triphenylene skeleton is directly connected with a crown ether ring, thus failing to assume mesomorphic due to lack of flexibility.

On the other hand, the triphenylene derivative of the formula (I) according to the present invention is characterized by a specific side chain structure, i.e., at least one one ethoxy or propoxy group-containing segment having at least two ether oxygen atoms.

The triphenylene derivative of the formula (I) of the present invention may be used in combination with at least one species of another mesomorphic or non-mesomorphic compound in order to appropriately control a liquid crystal phase and/or its phase transition temperature. Further, in the case where the triphenylene derivative of the formula (I) has a terminal polymerizable group, it becomes possible to solidify or fix the triphenylene derivative of the formula (I) through crosslinking or polymerization.

The triphenylene derivative of the formula (I) assumes a discotic columnar (liquid crystal) phase wherein liquid crystal molecules are aligned or oriented to form a columnar structure allowing an effective electron (or hole)-transporting function, etc. Further, the presence of the ether oxygen atoms allows a larger permittivity, thus being expected to provide an improved ion-transporting function as a component at an electrolyte. In this case, it is possible to prepare a good electrolyte by mixing the triphenylene derivative of the formula (I) with metal salt (metal ions).

Next, the ion-transporting layer structure and method according to the present invention will be described.

The ion-transporting layer structure of the present invention is constituted by a plurality of ion-transporting molecules which have a polar molecular chain (e.g., a side or terminal chain) and are arranged in a layer of a ion-transporting compound or composition. In the layer, a plurality of the polar molecular chains are two-dimensionally extended in a layer directin and associated with each other to form a channel (ion-transporting channel) through which an ion is transported in a direction perpendicular to the layer direction, i.e., an extension direction of the polar molecular (side) chains.

Specifically, the ion-transporting compound used in the present invention comprise a plurality of ion-transporting molecules having a discotic mesogen group and a polar side chain connected to the discotic mesogen group and assumes a discotic liquid crystal (mesomorphic) phase. In the discotic liquid crystal phase (preferably discotic columnar phase), liquid crystal molecules are aligned to form an associated structure at a portion consisting of a plurality of the polar side chains so as to form an ion-transporting channel in a particular direction perpendicular to the layer direction, thus exhibiting an anisotropy in degree of ion-transporting (or ionic conductivity). In this case, ion-transporting is effected based on the interaction of the polar side chain portion with ions.

The ion-transporting composition used in the present invention comprises at least one species of the above-mentioned ion-transporting compound provided with the ion-transporting channel, and the ion-transporting method of the present invention utilizes such a ion-transporting channel ensuring an effective ion-transporting.

Figure 3:
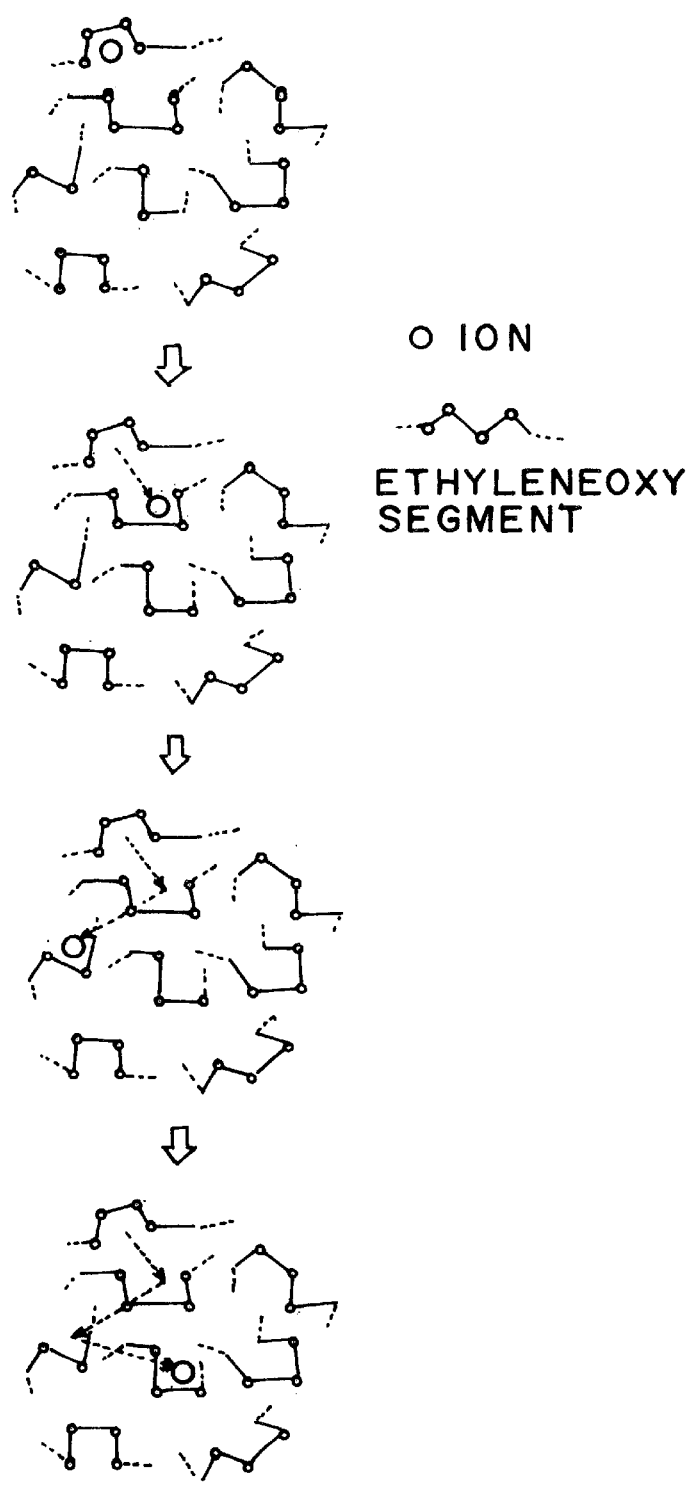
FIG. 3 is a schematic view for illustrating an ion-transporting mechanism of PEO.

FIG. 3 is a schematic view for illustrating ion-transporting mechanism of polyethylene oxide (PEO) comprising a plurality of ethylene oxide (ethoxy) segments.

Referring to FIG. 3, an ion is transferred in an entanglement state of the ethylene oxide segments, thus moving in a considerably round about route, not in a substantially linear (straight) route. Further, as described above, the transfer of the ion is based on the segment movement of the polymer chain. Accordingly, when the segment movement is impaired at low temperatures, the mobility of the ion is extremely lowered.

On the other hand, in the present invention, the ion-transporting mechanism is principally based on the formation of the ion-transporting channel due to self-organization or self-association of discotic liquid crystal molecules in discotic columnar phase, as shown in FIGS. 4 and 5.

Referring to FIG. 4, by utilizing self-organization (association) properties of the discotic liquid crystal molecular, the degree of order of the polar side chains interacting with ions is increased to form an ion-transporting channel at the ordered side chain portion. The thus-formed ion-transporting channel extends substantially linearly in the discotic columnar phase different from that of PEO, thus ensuring a substantially linear transfer of the ions.

FIG. 5 is another ion-transporting mechanism in the ion-transporting method of the present invention.

Referring to FIG. 5, the plurality of ethylene oxide (ethoxy) segments are aligned to form a pseudo crown ether ring (a ring similar to the crown ether ring), thus allowing not only the segment movement of the polymer size chain but also hopping movement (transfer) of the ions in a free volume space. In the free volume space, the ions can be moved linearly without no constraint force.

Such a ion-transporting mechanism not depending only on the side chain segment movement suggests the possibility of an ion-transporting method having a small temperature-dependence of ion transfer degree (ionic conductivity). Further, the ion-transporting method of the present invention is considered to provide an ion mobility anisotropy (or ionic conductivity anisotropy). More specifically, as mentioned above, the ion transfer is effected preferentially through the ion-transporting channel along an extension direction of the columnar structure of the discotic liquid crystal, i.e., in a direction of an arrow Y. Accordingly, the degree of the ion transfer (ionic conductivity) is utterly different from that in a direction of an arrow X perpendicular to the columnar structure extension direction (i.e., the Y direction), thus resulting in a considerably larger ionic conductivity in the Y direction along the ion-transporting channel.

The use of the crown ether ring as an ion-transporting channel has been heretofore known in the above-described references.

However, the crown ether is developed in order to include or enclose the ions and the ion inclusion capability is largely depend upon a size of the crown ether ring. Accordingly, the crown ether can readily trap ions by selecting an appropriate ring size but is required to a large energy for releasing the trapped ions.

On the other hand, in the present invention, the above-mentioned pseudo crown ether ring comprising the ethoxy-group containing segments of the ion-transporting layer structure is not completely closed, thus being readily changed in the pseudo ring size. As a result, it is possible to readily effect release or dissociation of the trapped ion, thus allowing smooth ion movement.

Examples of the ion-transporting compound for realizing the ion-transporting method of the present invention may include those having a molecular structure comprising a discotic mesogen group and a polar side chain connected thereto and assuming a discotic liquid crystal phase as mentioned above.

The ion-transporting compound constituting the ion-transporting layer structure may assume the discotic liquid crystal (columnar) phase alone or in combination with another ion-transporting compound. Such a ion-transporting compound may be solidified or fixed through polymerization or crosslinking.

The ion-transporting compound having the discotic liquid crystal phase may preferably be a thermotropic liquid crystal or a lyotropic liquid crystal.

Examples of the discotic mesogen group of the ion-transporting compound per se assuming the discotic liquid crystal phase may include those having 3- or 6-substituted ring structures of benzene, triphenylene, truxene, phthalocyanine, porphyrin, tribenzocyclononene: and tetra-benzocyclodedecylene.

Examples of the polar side chain of the ion-transporting compound may include monovalent groups of polyethers, polyesters and polyimines and may preferably be those represented by the following structures (a) to (h):

(a) $O(CH_2CH_2O)_n R_{11}$
(b) $O(CH_2CH_2CH_2O)_n R_{11}$
(c) $O(CHCH_3CH_2O)_n R_{11}$
(d) $O(CH_2)_p CH(CH_2CH_2O)_n R_{11}(CH_2CH_2O)_m R_{12}$
(e) $COO(CH_2CH_2COO)_n R_{11}$
(f) $OOC(CH_2CH_2OOC)_n R_{11}$
(g) $O(CH_2CH_2NH)_n R_{11}$
(h) $O(CH_2CH_2NCH_3)_n R_{11}$ wherein $R_{11}$ and $R_{12}$ independently denote a linear or branched alkyl group having 1–20 carbon atoms and the alkyl group may include at least one hydrogen atom optionally substituted with fluorine atom and may also include at least one methylene group optionally substituted with —O—, —CO—, —CH=CH—, —C≡C— or epoxy group; and n, m and, p are independently an integer of 1–20.

Of the above structures (a) to (h), the structures (a) to (d) may particularly be preferred.

The ion-transporting compound may preferably be the above-mentioned triphenylene derivative represented by the formula (I), e.g., specifically enumerated in Tables 1–9.

The ion-transporting composition constituting the ion-transporting layer structure of the present invention comprises at least two species of substances at least one of which is the above-mentioned ion-transporting compound.

In the case where the ion-transporting composition contains another substance in addition to the ion-transporting compound, examples of another substance may include an organic solvent, water and a metal salt.

Examples of the organic solvent may include ethylene carbonate, propylene carbonate, γ-butyrolactone, tetrahydrofuran, dioxane, methyl ethyl ketone, methyl propionate, dimethoxy ethane and glycols.

When the ion-transporting compound is mixed with water, the resultant ion-transporting composition assumes a lyotropic liquid crystal phase.

Examples of the metal salt may include: salts of alkali metals, such as $MClO_4$, $MBF_4$, $MPF_6$, $MCF_3SO_3$ (M:Li, Na, K, etc.):and those, such as $CuSO_4$, $Ni(NO_3)_2$ and $Ni(BF_4)_2$. Among these, lithium metal salts, such as $LiClO_4$, $LiBF_4$, $LiPF_6$, $LiCF_3SO_2$ may preferably be used.

In the case of using the solidified or fixed ion-transporting compound, 1–8 side (terminal) chains of the discotic liquid crystal (e.g., triphenylene derivative of the formula (I)) may preferably be a polymerizable group, such as acryl, methacryl, epoxy or vinyl, for effecting homopolymerization. The discotic liquid crystal having the polymerizable side chain(s) may be co-polymerized with another polymerizable compound, such as acrylic acid derivatives, methacrylic acid derivatives, vinyl derivatives, styrene derivatives, urethane derivatives and epoxy derivatives.

The above-mentioned ion-transporting compound and composition for use in the ion-transporting method of the present invention may advantageously used in electrolyte, e.g., for secondary battery.

The electrolyte according to the present invention, as described above, is characterized by a combination of a compound having at least one discotic mesogen group and a polar side (terminal) chain connected to the discotic mesogen group with at least one species of metal salt and by an ionic conductivity anisotropy (anisotropy in ion conductive characteristic).

The polar side chain may preferably be a side chain having at least two ether linkages (ether oxygen atoms) in view of polarity and/or chemical stability. In a more preferred embodiment, the polar side chain is comprised of ethoxy group ($OCH_2CH_2$)-containing segment or propoxy group ($OCH_2CH_2CH_2$)-containing segment each having,at least two ether linkages and a terminal portion connected thereto comprising a linear or branched alkyl group having 1–20 carbon atoms (wherein the alkyl group may include at least one hydrogen atom optionally substituted with fluorine atom and at least one methylene group optionally substituted with —O—, —CO—, —CH=CH—, —C≡C— or epoxy group.

Examples of the polar side chain of the ion-transporting compound of the electrolyte may preferably be those represented by the following structures (a), (b) and (c):

(a) $O(CH_2CH_2O)_nR_{11}$
(b) $O(CH_2CH_{2H}O)_nR_{11}$
(c) $O(CHCH^3H_2O)_nR_{11}$ wherein m is an integer of 1–20, and $R_{11}$ and $R_{12}$ independently denote a linear or branched alkyl group having 1–20 carbon atoms and the alkyl group may include at least one hydrogen atom optionally substituted with fluorine atom and may also include at least one methylene group optionally substituted with —O—, —CO—, —CH=CH—, —C≡C— or epoxy group.

From the viewpoint of mesomorphism, planality and chemical stability, examples of the discotic mesogen group of the compound of the electrolyte may preferably be a group selected from the group consisting of 3- or 6-substituted ring structures of benzene, triphenylene, truxene, phthalocyanine, porphyrin, tribenzocyclononene and tetrabenzocyclo-dedecylene.

Examples of the metal salt of the electrolyte may include: salts of alkali metals, such as $MClO_4$, $MBF_4$, $MPF_6$, $MCF_3SO_2$ (M:Li, Na, K, etc.) and those, such as $CuSO_4$, $Ni(NO_3)_2$ and $Ni(BF_4)_2$. Among these, lithium metal salts, such as $LiClO_4$, $LiBF_4$, $LiPF_6$, $LiCF_3SO_2$ may preferably be used.

The electrolyte according to the present invention may desirably contain the metal salt in an amount of 0.01–50 mol. %, preferably 0.1–30 mol. %.

The electrolyte may further contain an organic solvent, preferably a polar organic solvent, examples of which may include: ethylene carbonate, propylene carbonate, y-butyrolactone, tetrahydrofuran, dioxane, methyl ethyl ketone, methyl propionate, dimethoxy ethane and glycols.

The discotic liquid crystal phase of the electrolyte may preferably be a discotic columnar phase.

The electrolyte of the present invention may preferably be used in a solidified or fixed from through polymerization.

In the case of using the solidified or fixed electrolyte, 1–8 side (terminal) chains of at least one species of the compound constituting the electrolyte may preferably be a polymerizable group, such as acryl, methacryl, epoxy or vinyl, for effecting homopolymerization. The compound having the polymerizable side chain(s) may be co-polymerized with another polymerizable compound, such as acrylic acid derivatives, methacrylic acid derivatives, vinyl derivatives, styrene derivatives, urethane derivatives and epoxy derivatives.

The compound contained in the electrolyte of the present invention may preferably be the above-mentioned triphenylene derivative represented by the formula (I), e.g., specifically enumerated in Tables 1–9, i.e., the above-mentioned ion-transporting compound provided with the ion-transporting channel at the polar side chain portion.

As described above, the ion-transporting channel has been conventionally constituted by the crown ether ring as described in, e.g., JP-A 10-120730.

However, when the crown ether ring is used as the discotic mesogen group, the resultant discotic mesogen group lacks planarity and rigidity or stiffness. Further, when used as the side chain, the resultant side chain lacks flexibility. As a result, compounds having the crown ether ring little assume mesomorphism. In the reference (JP-A 10-120730), its compounds do not assume a mesomorphic (liquid crystal) phase and a columnar structure is formed by effecting magnetic field alignment.

The compound used in the electrolyte of the present invention has a polar side chain free from a ring structure but has a structure similar to the crown ether ring (the pseudo crown ether ring as described above with respect to the ion-transporting layer structure), thus being advantageous to development of mesomorphic without impairing the flexibility of the polar side chain. As a result, the compound for the electrolyte is not required to be subjected to the magnetic field alignment, etc.

When the compound for the electrolyte is comprised of the above-mentioned ion-transporting compound, as specifically described above, the compound is excellent in functions of trapping ions and releasing the trapped ions due to the pseudo crown ether ring (which is not completely closed), compared with the crown ether ring (which is completely closed). As a result, it is possible to advantageously form an ion-transporting channel by utilizing the discotic liquid crystal (columnar) phase, thus resulting in an anisotropy in ion transfer capability or an ionic conductivity anisotropy.

Figure 6:
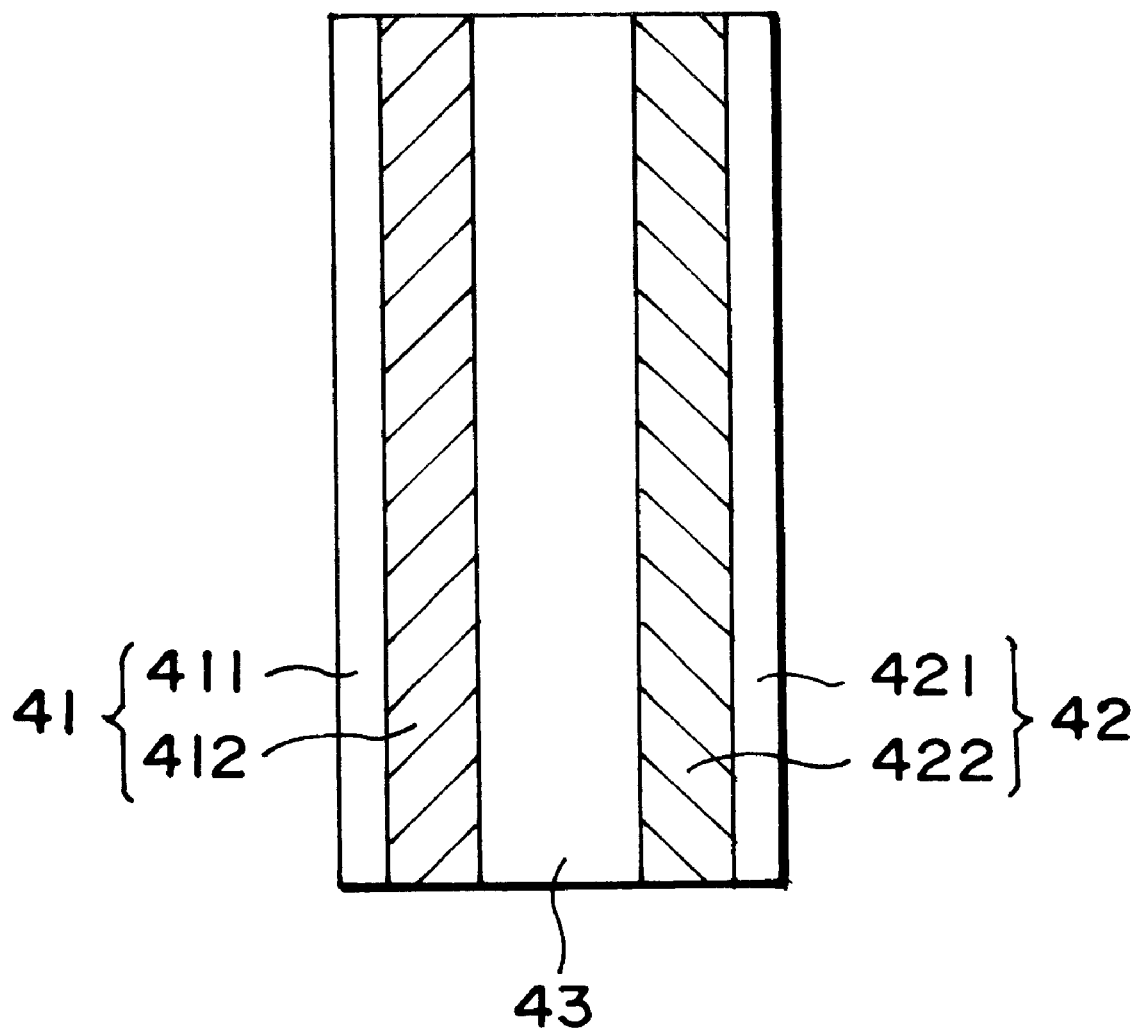
FIG. 6 is a schematic sectional view of an embodiment of secondary battery including the electrolyte according to the present invention.

Hereinbelow, as a specifically applied example of the electrolyte (also the triphenylene derivative, ion-transporting layer structure and method as described above), a secondary battery using the electrolyte will be described with reference to FIG. 6 showing a schematic sectional view thereof.

Referring to FIG. 6, the secondary battery comprises a negative electrode 41, a positive electrode 42 and layer 43 of an electrolyte disposed therebetween.

A specific-polarity ion is transferred from the negative electrode 41 to the positive electrode 42 or from the positive electrode 42 to the negative electrode 41 via the electrolyte layer 43 as an ion-transporting passage.

The negative and positive electrodes 41 and 43 may each generally be a composite member comprising a plurality of layers of a function-separated type in order to realize various functions, such as ion dissociation and absorption function, cooperative or associative function with an external device (e.g., electron transfer function), mechanically supporting function, etc.

Specifically, the negative electrode 41 comprises an electroconductive support 411 (having also an electronically connecting function with an external circuit) of, e.g., copper, aluminum, gold or platinum and a coating layer 412 of an negative active substance disposed on the support 411. It is also possible to use a layer of a negative active substance having also the function as the support.

The negative active substance has a function of releasing alkali metal ion (e.g., Li ion, Na ion or K ion), alkali-earth metal ion, or cation (e.g., H ion).

Examples of the negative active substance may include: metallic materials, such as lithium metal foil and lithium-aluminum alloy; polymeric materials, such as n-type doped polyacetylene, polythiophene, poly-p-phenylene, and their derivatives; carbon-based materials, such as graphite, pitch and cokes; sintered products of organic polymers; and composite materials of organic polymers with the above-mentioned materials. These materials may appropriately used selectively.

The positive electrode 42 comprises an electroconductive support 421 (having also an electronically connecting function with an external circuit) of, e.g., copper, aluminum, gold or platinum and a coating layer 422 of an positive active substance disposed on the support 421. It is also possible to use a layer of a positive active substance having also the function as the support.

Examples of the positive active substance may include: metallic materials including calcogenides and oxides of transfer metals, such as cobalt, vanadium, titanium, molybdenum, iron, manganese and composites of these compounds with lithium; polymeric materials, such as p-type or n-type doped polyacetylene, polyaniline, polypyrrole, polythiophene, poly-p-phenylene, polyphthalocyanine, polypyridine and their derivatives; carbon-based layered materials, such as graphite, fluorinated carbon and composite materials of organic polymers with the above-mentioned materials. These materials may appropriately used selectively.

Production Example 1

Production of 2,3,6,7,10,11-hexa(2-hexyloxyethoxy) triphenylene (Ex. Comp. No. T-6)

(1) Production of 2-hexyloxyethyl p-toluenesulfonate In a reaction vessel, 3.29 g (22.5 mM) of 2-hexyloxyethanol and 5.33 g (67.5 mM) of pyridine were placed, and on an ice bath, 4.75 g (24.7 mM of p-toluenesulfonic acid chloride was added and stirred to 1 hour, followed by further stirring for 3 hours at room temperature.

After the reaction, the reaction mixture was acidified with 3N-HCl, followed by extraction two times with toluene. The extract was washed with water and dried with anhydrous sodium sulfate, followed by distilling-off of the solvent and purification by silica gel column chromatography (eluent: toluene/ethyl acetate=10/1) to obtain 6.45 g (21.5 mM) of 2-hexyloxyethyl p-toluenesulfonate (Yield: 95 %).

(2) Production of 2,3,6,7,10,11-hexa(2-hexyloxy-ethoxy) triphenylene

In a reaction vessel, 15 ml of dry N,N-dimethylformamide (:DMF) and 0.77 g (19.3 mM) of NaH (60% in mineral oil) were placed. Then, 0.92 g (2.84 mM) of 2,3,6,7,10,1:1-hexahydroxytriphenylene was added thereto on a water bath, and after 1 hour of stirring, a mixture liquid of 6.3 g (21.0 mM of 2-hexyloxyethyl p-toluenesulfonate and 5 ml of dry DMF was added dropwise thereto, followed by 5 hours of stirring at 80° C. After the reaction, water was added to the reaction mixture, followed by extraction two times with toluene. The extract was washed with water and dried with anhydrous sodium sulfate, followed by distilling-off the solvent and purification two times by silica gel column chromatography (eluent: toluene/ethyl acetate=5/1) to obtain 1.15 g (1.0 mM) of 2,3,6,7,10,11-hexa(2-hexyloxyethoxy)triphenylene (Yield: 35%), which provided an NMR chart as shown in FIG. 1.

Phase transition temperature (° C.)

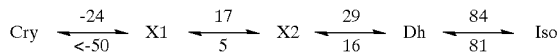

Cry: crystal phase
X1, X2: un-identified phase
Dh: (hexagonal)discotic columnar phase
Iso: isotropic phase Production Example 2

Production of 2,3,6,7,10,11-hexa(1,4,7-trioxatridecyl) triphenylene (Ex. Comp. No. T-16)

(1) Production of 1,4,7-trioxatridecyl p-toluenesulfonate
In a reaction vessel, 8.55 g (45.0 mM) of 2-(2-hexyloxyethoxy) and 10.7 g (135 mM) of pyridine were placed, and on an ice bath, 9.43 g (49.5 mM of p-toluenesulfonic acid chloride was added and stirred to 1 hour, followed by further stirring for 2 hours at room temperature.

After the reaction, the reaction mixture was acidified with 3N-HCl, followed by extraction two times with toluene. The extract was washed with water and dried with anhydrous sodium sulfate, followed by distilling-off of the solvent and purification by silica gel column chromatography (eluent: toluene/ethyl acetate=15/1) to obtain 13.24 g (38.5 mM) of 1,4,7-trioxatridecyl p-toluenesulfonate (Yield: 86%)

(2) Production of 2,3,6,7,10,11-hexa(1,4,7-trioxatridecyl) trippenylene

Figure 2:
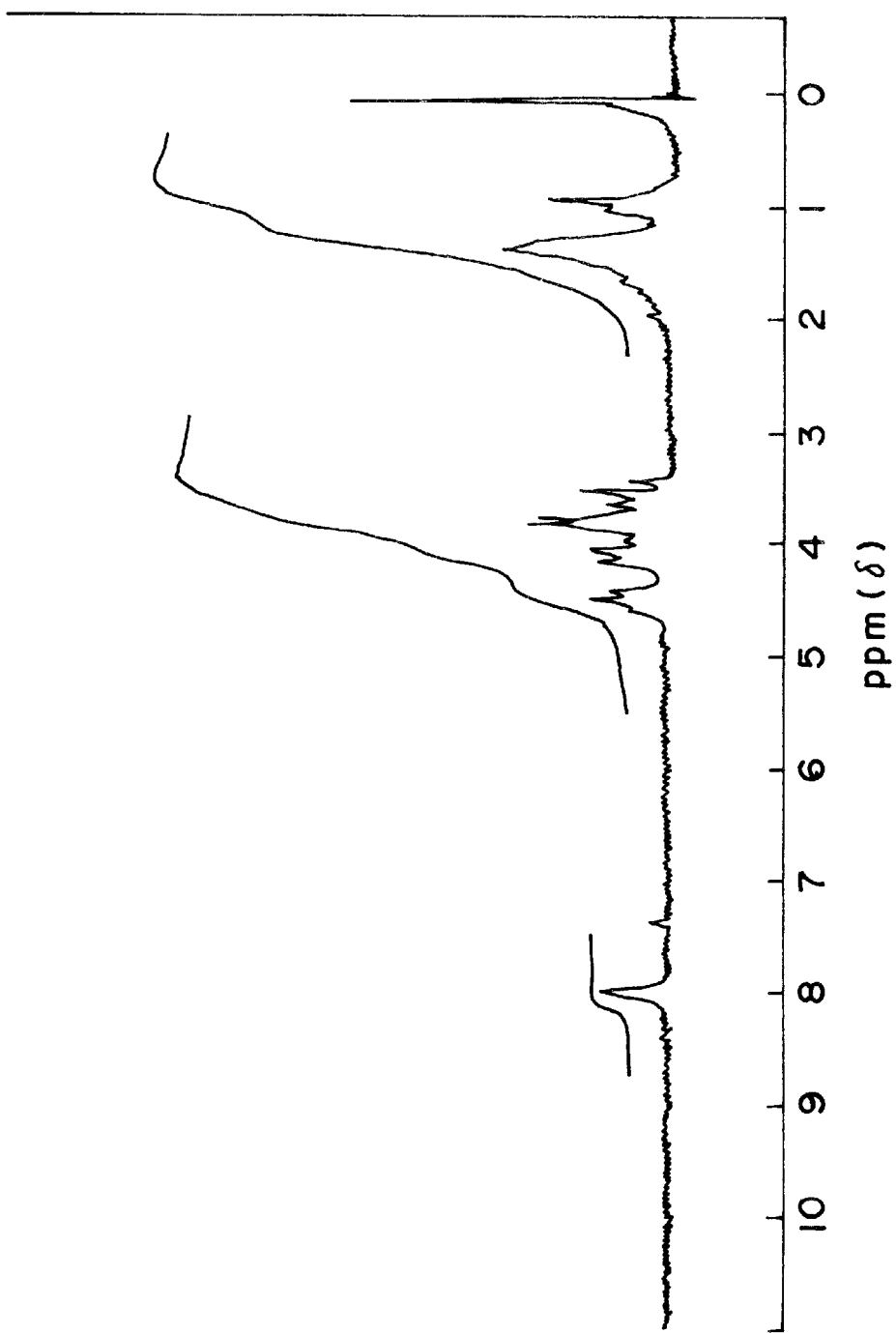
FIG. 2 is an NMR chart for 2,3,6,7,10,11-hexa(1,4,7-trioxatridecyl)triphenylene prepared in Production Example 2.

In a reaction vessel, 15 ml of dry N,N-dimethylformamide (PMF) and 0.77 g (19.3 mM) of NaH (60% in mineral oil) were placed. Then, 0.92 g (2.84 mM) of 2,3,6,7,10,11-hexahydroxytriphenylene was added thereto on a water bath, and after 1 hour of stirring, a mixture liquid of:7.3 g (20.9 mM of 1,4,7-hexyloxyethyl p-toluenesulfonate and 5 ml of dry DMF was added dropwise thereto, followed by 6 hours of stirring at 80° C. After the reaction, water was added to the reaction mixture, followed by extraction two times with toluene. The extract was washed with water and dried with anhydrous sodium sulfate, followed by distilling-off the solvent and purification three times by silica gel column chromatography (eluent: chloroform to obtain 0.95 g (0.70 mM) of 2,3,6,7,10,11-hexa(1,4,7-trioxytridecyl) triphenylene (Yield: 25%), which provided an NMR chart as shown in FIG. 2.

Phase transition temperature (° C.)

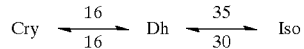

Production Example 3

Production of 2,3,6,7,10,11-hexa(1,4,7-trioxaoctyl) triphenylene (Ex. Comp. No. T-11)

(1) Production of 1,4,7-trioxaoctyl p-toluenesulfonate
In a reaction vessel, 3.0 g (25.0 mM) of diethylene glycol monomethyl ether and 5.93 g (75 mM) of pyridine were placed, and on an ice bath, 5.24 g (27.5 mM of p-toluenesulfonic acid chloride was added and stirred to 1 hour, followed by further stirring for 3 hours at room temperature.

After the reaction, the reaction mixture was acidified with 3N-HCl, followed by extraction two times with toluene. The extract was washed with water and dried with anhydrous sodium sulfate, followed by distilling-off of the solvent and purification by silica gel column chromatography (eluent: toluene/ethyl acetate=10/1) to obtain 6.57 g (24.0 mM) of 1,4,7-trioxaoctyl p-toluenesulfonate (Yield: 96

(2) Production of 2.,3,6,7,10,11-hexa(1,4,7-trioxaoctyl) triphenylene

In a reaction vessel, 15 ml of dry N,N-dimethylformamide (DMF) and 0.77 g (19.3 mM) of NaH (60 W in mineral oil) were placed. Then, 0.92 g (2.84 mM) of 2,3,6,7,10,11-hexahydroxytriphenylene was added thereto on a water bath, and after 1 hour of stirring, a mixture liquid of 6.4 g (23.3 mM of 1,4,7-trioxaoctyl p-toluenesulfonate and 5 ml of dry DMF was added dropwise thereto, followed by 5 hours of stirring at 80° C. After the reaction, water was added to the reaction mixture, followed by extraction two times with toluene. The extract was washed with water and dried with anhydrous sodium sulfate, followed by distilling-off the solvent and purification three times by silica gel column chromatography (eluent: chloroform to obtain 0.14 g (0.15 mM) of 2,3,6,7,10,11-hexa(1,4,7-trioxaoctyl)triphenylene (Yield: 5%), which showed a melting point of 54 ° C.

<Preparation of Mixture (Electrolyte)>

Mixture A

To 65.6 mg (0.06 mM) of 2,3,6,7,10,11-hexa(2-hexyloxyethoxy)triphenylene (Ex. Comp. No. T-6) synthesized in Production Example 1, 1 ml of dry dichloromethane was added, followed by stirring for complete dissolution. To the solution, 0.64 mg (0.006 mM) of lithium perchlorate and 1 ml of dry ethanol were added, followed by stirring for 2 hours. After confirming the complete dissolution of the reaction mixture, the solvent was distilled off. The reaction mixture was dried under reduced pressure to obtain Mixture A containing 10 mol. % of lithium salt.

Phase transition temperature (° C.)

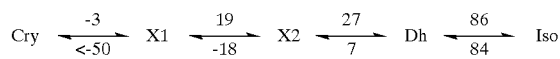

Mixture B

To 65.6 mg (0.06 mM) of 2,3,6,7,10,11-hexa(2-hexyloxyethoxy)triphenylene (Ex. Comp. No. T-6) synthesized in Production Example 1, 1 ml of dry dichloromethane was added, followed by stirring for complete dissolution. To the solution, 3.19 mg (0.03 mM) of lithium perchlorate and 1 ml of dry ethanol were added, followed by stirring for 2 hours. After confirming the complete dissolution of the reaction mixture, the solvent was distilled off. The reaction mixture was dried under reduced pressure to obtain Mixture B containing 50 mol. % of lithium salt.

Phase transition temperature (° C.)

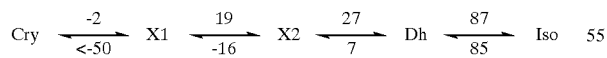

Mixture C

To 81.5 mg (0.06 mM) of 2,3,6,7,10,11 -hexa(1,4,7-trioxatridecyl)triphenylene (Ex. Comp. No. T-16) synthesized in Production Example 2, 1 ml of dry dichloromethane was added, followed by stirring for complete dissolution. To the solution, 0.64 mg (0.006 mM) of lithium perchlorate and 1 ml of dry ethanol were-added, followed by stirring for 2 hours. After confirming the complete dissolution of the reaction mixture, the solvent was distilled off. The reaction mixture was dried under reduced pressure to obtain Mixture C containing 10 mol. % of lithium salt.

Phase transition temperature (° C.)

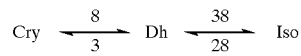

EXAMPLE 1

A pair of 1.1 mm-thick glass substrates each coated with a 700 Å-thick ITO (indium tin oxide) film (as transparent electrode) was prepared.

On one of the above-prepared glass substrates, silica beads having an average particle size of 2.4 μm were dispersed and thereon, the other glass substrate was superposed to prepare a blank cell.

Into the blank cell, 2,3,6,7,10,11-hexa(2-hexyloxyethoxy) triphenylene (Ex. Comp. No. T-6) prepared in Production Example 1 was injected in its isotropic liquid state, followed by cooling to discotic liquid crystal (columnar) phase temperature at 20° C./hour.

When a texture of the resultant liquid crystal cell (device) was observed through a polarizing microscope under a cross-nicol relationship, a dark state (dark field of view) was confirmed. Accordingly, it was found that discotic liquid crystal molecules were in a homeotropic alignment state.

Further, when the liquid crystal cell was subjected to measurement of ionic conductivity in the following manner.

The liquid crystal cell was supplied with an AC-voltage (0.001–100 kHz, 10 mV) to measure a current value.

Based on the measured current value, a complex impedance was obtained to calculate an ionic conductivity (σ) according to the following equation:

$$\sigma = d/(Z \times S),$$

wherein σ is an ionic conductivity, d is a thickness of the electrolyter layer, Z is the complex impedance, and S is an electrode area.

The results are shown below.

| Temp. (° C.) | Ionic conductivity (S/cm) |
|---|---|
| 30 | $3.3 \times 10^{-13}$ |
| 50 | $1.8 \times 10^{-12}$ |
| 70 | $7.2 \times 10^{-12}$ |

EXAMPLE 2

A liquid crystal cell (device) was prepared and evaluated in the same manner as in Example 1 except for using 2,3,6,7,10,11-hexa(1,4,7-trioxatridecyl)triphenylene (Ex. Comp. No. T-16) prepared in Production Example 2 in place of that (Ex. Comp. No. T-6) used in Example 1.

As a result, a homeotropic alignment state of discotic liquid crystal molecules was confirmed similarly as in Example 1.

The results of ionic conductivity measurement are shown below.

| Temp. (° C.) | Ionic conductivity (S/cm) |
| --- | --- |
| 10 | $1.6 \times 10^{-11}$ |
| 30 | $2.5 \times 10^{-10}$ |

EXAMPLE 3

A pair of 1.1 mm-thick glass substrates each coated with a 700 Å-thick ITO (indium tin oxide) film (as transparent electrode) was prepared.

On one of the above-prepared glass substrates, silica beads having an average particle size of 2.4 μm were dispersed and thereon, the other glass substrate was superposed to prepare a blank cell.

Into the blank cell, the above-prepared Mixture (electrolyte) A was injected in its isotropic liquid state, followed by cooling to discotic liquid crystal (columnar) phase temperature at 20° C./hour.

When a texture of the resultant liquid crystal cell (device) was observed through a polarizing microscope under a cross-nicol relationship, a dark state (dark field of view) was confirmed. Accordingly, it was found that discotic liquid crystal molecules were in a homeotropic alignment state.

Further, when the liquid crystal cell was subjected to measurement of ionic conductivity in the same manner as in Example 1.

| Temp. (° C.) | Ionic conductivity (S/cm) |
| --- | --- |
| 30 | $3.3 \times 10^{-10}$ |
| 50 | $1.6 \times 10^{-9}$ |
| 70 | $4.9 \times 10^{-9}$ |

Then, in a similar manner as above, a liquid crystal cell was prepared and evaluated except that the silica beads having an average particle size of 2.4 μm were changed to those having a particle size of 20 μm.

As a result of texture observation through the cross-nicol polarizer, a multi-domain was confirmed to result in a random alignment state of discotic liquid crystal molecules.

The results of ionic conductivity measurement are shown below.

| Temp. (° C.) | Ionic conductivity (S/cm) |
| --- | --- |
| 30 | $6.0 \times 10^{-12}$ |
| 50 | $5.6 \times 10^{-11}$ |
| 70 | $4.3 \times 10^{-10}$ |

EXAMPLE 4

Two liquid crystal cells were prepared and evaluated in the same manner as in Example 3 except that Mixture A was changed to Mixture B prepared above.

As a result, the liquid crystal cell including 2.4 μmø-silica beads provided a dark field of view, thus confirming a homeotropic alignment state for discotic liquid crystal molecules. On the other hand, the liquid crystal cell including 20 μmø-silica beads provided a multi-domain, thus confirming a random alignment state for discotic liquid crystal molecules.

The results of ionic conductivity measurement are shown below.

<For 2.4 μmø-silica bead cell>

| Temp. (° C.) | Ionic conductivity (S/cm) |
| --- | --- |
| 30 | $4.9 \times 10^{-10}$ |
| 50 | $2.4 \times 10^{-9}$ |
| 70 | $8.3 \times 10^{-9}$ |

<For 20 μmø-silica bead cell>

| Temp. (° C.) | Ionic conductivity (S/cm) |
| --- | --- |
| 30 | $9.0 \times 10^{-12}$ |
| 50 | $1.8 \times 10^{-10}$ |
| 70 | $9.9 \times 10^{-10}$ |

EXAMPLE 5

Two liquid crystal cells were prepared and evaluated in the same manner as in Example 3 except that Mixture A was changed to Mixture C prepared above.

As a result, the liquid crystal cell including 2.4 μmø-silica beads provided a dark field of view, thus confirming a homeotropic alignment state for discotic liquid crystal molecules. On the other hand, the liquid crystal cell including 20 μmø-silica beads provided a multi-domain, thus confirming a random alignment state for discotic liquid crystal molecules.

The results of ionic conductivity measurement are shown below.

<For 2.4 μmø-silica bead cell>

| Temp. (° C.) | Ionic conductivity (S/cm) |
| --- | --- |
| 10 | $2.0 \times 10^{-9}$ |
| 30 | $1.4 \times 10^{-8}$ |
| 50 | $4.6 \times 10^{-8}$ |

<For 20 μmø-silica bead cell>

| Temp. (° C.) | Ionic conductivity (S/cm) |
| --- | --- |
| 10 | $3.3 \times 10^{-11}$ |
| 30 | $7.6 \times 10^{-10}$ |
| 50 | $8.9 \times 10^{-9}$ |

For the results of Examples 3–5, the electrolytes (Mixtures A, B and C) according to the present invention were found to exhibit an ionic conductivity anisotropy and allowed a homeotropic alignment state for their discotic liquid crystal molecules.

Further, as apparent from comparison between the 2.4 μmø-silica bead cells and the 20 μmø-silica bead cells in Examples 3–5, the 2.4 μmø-silica bead cells having a columnar structure provided with an ion channel were found to provide higher ion conductivities and smaller temperature-dependence thereof.

As described hereinabove, according to the present invention, it is possible to obtain a triphenylene derivative useful for a discotic liquid crystal material or ion-transporting compound.

Further, by utilizing a discotic liquid crystal (columnar) phase, it is also possible to obtain useful ion-transporting compound, composition and method, particularly using the triphenylene derivative.

It is further possible to provide an electrolyte having, an ionic conductivity anisotropy suitable for secondary battery, sensor device, etc., in the field of electronics.

What is claimed is:

1. An ion-transporting layer structure, comprising:
    a plurality of ion-transporting molecules having a polar molecular chain and arranged in a layer wherein a plurality of the polar molecular chains are extended in a layer direction and associated with each other to form a channel through which an ion is transported in a direction perpendicular to the layer direction.

2. A structure according to claim 1, wherein said ion-transporting molecules comprise a discotic mesogen group and a polar side chain as said polar molecular chain.

3. A structure according to claim 1, wherein said ion-transporting molecules constitute a triphenylene derivative of the following formula (I):

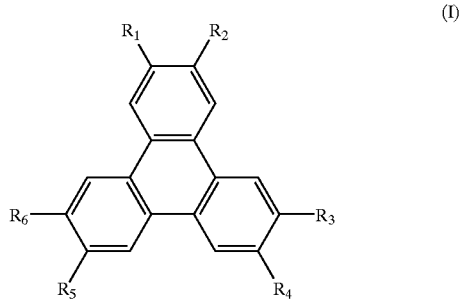

wherein $R_1$–$R_6$ independently denote an ethoxy or propoxy group-containing segment having at least two ether oxygen atoms and a terminal group comprising a linear or branched alkyl group having 1–20 carbon atoms, said alkyl group including at least one hydrogen atom optionally substituted with fluorine atom and at least one methylene group optionally substituted with —O—, —CO—, —CH=CH—, —C≡C— or epoxy group.

4. A structure according to claim 1, wherein the channel is formed in a discotic liquid crystal phase.

5. A structure according to claim 4, wherein the discotic liquid crystal phase is a thermotropic liquid crystal phase.

6. A structure according to claim 4, wherein the discotic liquid crystal phase is a lyotropic liquid crytal phase.

7. A structure according to claim 1, wherein said ion is alkali metal ion.

8. A structure according to claim 1, wherein the layer comprises at least one species of an ion-transporting compound.

9. A structure according to claim 1, wherein the layer further comprises an organic solvent.

10. An ion-transporting method, comprising:
    a step of arranging in a layer a plurality of ion-transporting molecules having a polar molecular chains so that a plurality of the polar molecular chains are extended in a layer direction and associated with each other to form a channel through which an ion is transported in a direction perpendicular to the layer direction.

11. A method according to claim 10, wherein the ion-transporting channel is formed in a discotic liquid crystal phase.

12. An electrolyte comprising: at least one species of a compound comprising a discotic mesogen group and a polar side chain connected to the discotic mesogen group, and at least one species of a metal salt, said electrolyte having an ionic conductivity anisotropy, wherein said electrolyte is solidified by polymerization.

* * * * *

UNITED STATES PATENT AND TRADEMARK OFFICE
CERTIFICATE OF CORRECTION

PATENT NO. : 6,464,904 B1
DATED : October 15, 2002
INVENTOR(S) : Takuji Hirose et al.

It is certified that error appears in the above-identified patent and that said Letters Patent is hereby corrected as shown below:

Title page,
Item [56], OTHER PUBLICATIONS, "Synthsis" should read -- Synthesis --.

Column 1,
Line 10, "discotxic" should read -- discotic --.

Column 3,
Line 67, "formula:(I)." should read -- formula (I). --.

Column 4,
Line 3, "be" should be deleted; and
Line 7, "atom-and" should read -- atom and --.

Column 5,
Line 50, "—$R_5$" should read -- —$R_3$ --; and
Line 59, "$OC_6H_{11}$" should read -- $OC_5H_{11}$ --.

Column 6,
Lines 11 and 45, "—$R_5$" should read -- —$R_3$ --.

Column 7,
Lines 12 and 44, "—$R_5$" should read -- —$R_3$ --.

Column 8,
Lines 12 and 44, "—$R_5$" should read -- —$R_3$ --.

Column 9,
Lines 10 and 38, "—$R_5$" should read -- —$R_3$ --;
Line 17, "$C_6H_{11}$" should read -- $C_5H_{11}$ --;
Line 57, "atoms" should read -- atom --;
Line 61, "mesomorphic" should read -- mesomorphism --; and
Line 65, "one one" should read -- one --.

Column 10,
Line 27, "directin" should read -- direction --; and
Line 33, "comprise" should read -- comprises --.

Column 11,
Line 17, "no" should read -- any --;
Line 38, "is" should be deleted; and
Line 39, "depend" should read -- depends --.

UNITED STATES PATENT AND TRADEMARK OFFICE
CERTIFICATE OF CORRECTION

PATENT NO. : 6,464,904 B1
DATED : October 15, 2002
INVENTOR(S) : Takuji Hirose et al.

It is certified that error appears in the above-identified patent and that said Letters Patent is hereby corrected as shown below:

Column 12,
Line 23, "and, p" should read -- and p --; and
Line 61, "used" should read -- be used --.

Column 13,
Line 7, "having, at" should read -- having at --;
Line 20, "$O(CH_2CH_{2H}O)_nR_{11}$" should read -- $O(CH_2CH_2CH_2O)_nR_{11}$ --;
Line 21, "$O(CHCH^3H_2O)_nR_{11}$" should read -- $O(CHCH_3CH_2O)_nR_{11}$ --; and
Line 53, "from" should read -- form --.

Column 14,
Line 20, "mesomorphic" should read -- mesomorphism --.

Column 15,
Lines 6 and 27, "used selectively." should read -- be selectively used. --;
Line 34, "p-toluenesulfonate In" should read -- p-toluenesulfonate. ¶ In --;
Lines 37 and 56, "mM" should read -- mM) --;
Line 51, "(:DMF)" should read -- (DMF) --; and
Line 52, "1:1-" should read -- 11- --.

Column 16,
Line 29, "86%)" should read -- 86%). --;
Line 31, "trippenylene" should read -- triphenylene --;
Line 33, "(PMF)" should read -- (DMF) --;
Line 36, "of: 7.3" should read -- of 7.3 --;
Line 38, "DMF" should read -- DMF) --; and
Line 62, "mM" should read -- mM) --.

Column 17,
Line 4, "96" should read -- 96%). --;
Line 5, "2., 3," should read -- 2, 3, --;
Line 8, "(60 W" should read -- (60% --; and
Line 12, "mM" should read -- mM) --.

Column 18,
Line 42, "electrolyter" should read -- electrolyte --.

Column 21,
Line 4, "having," should read -- having --.

UNITED STATES PATENT AND TRADEMARK OFFICE
CERTIFICATE OF CORRECTION

PATENT NO. : 6,464,904 B1
DATED : October 15, 2002
INVENTOR(S) : Takuji Hirose et al.

It is certified that error appears in the above-identified patent and that said Letters Patent is hereby corrected as shown below:

Column 22,
Line 11, "crytal" should read -- crystal --; and
Line 21, "chains" should read -- chain --.

Signed and Sealed this

Twenty-fourth Day of June, 2003

JAMES E. ROGAN
*Director of the United States Patent and Trademark Office*